(12) United States Patent
SenGupta et al.

(10) Patent No.: US 9,580,337 B2
(45) Date of Patent: Feb. 28, 2017

(54) PRESSURIZED FORWARD OSMOSIS PROCESS AND SYSTEM

(71) Applicants: Arup SenGupta, Bethlehem, PA (US); Robert Creighton, Manheim, PA (US); Ryan Smith, Bethlehem, PA (US)

(72) Inventors: Arup SenGupta, Bethlehem, PA (US); Robert Creighton, Manheim, PA (US); Ryan Smith, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 0 days.

(21) Appl. No.: 14/572,956

(22) Filed: Dec. 17, 2014

(65) Prior Publication Data

US 2015/0175447 A1    Jun. 25, 2015

Related U.S. Application Data

(60) Provisional application No. 61/920,512, filed on Dec. 24, 2013.

(51) Int. Cl.
*C02F 1/44* (2006.01)
*B01D 61/00* (2006.01)
(Continued)

(52) U.S. Cl.
CPC ............ *C02F 1/445* (2013.01); *B01D 61/002* (2013.01); *B01D 61/005* (2013.01); *B01D 61/58* (2013.01);
(Continued)

(58) Field of Classification Search
CPC ......... C02F 1/445; C02F 2103/08; C02F 1/44; B01D 61/005; B01D 61/002; B01D 61/58; C01F 5/02; C01F 5/14; C01F 5/20; C01F 5/24

See application file for complete search history.

(56) References Cited

U.S. PATENT DOCUMENTS

| | | | |
|---|---|---|---|
| 3,130,156 A | 4/1964 | Neff | |
| 4,370,307 A * | 1/1983 | Judd | C01F 5/02 423/165 |

(Continued)

FOREIGN PATENT DOCUMENTS

GB    WO 2014125269 A1 *    8/2014    .............. C02F 1/445

OTHER PUBLICATIONS

Achilli, A., et al. "Selection of inorganic-based draw solutions for forward osmosis applications," Journal of Membrane Science, 364: 233-241 (2010).*

(Continued)

*Primary Examiner* — Katherine Zalasky
*Assistant Examiner* — Benjamin Lebron
(74) *Attorney, Agent, or Firm* — Saul Ewing LLP

(57) ABSTRACT

A pressurized forward osmotic separation process is disclosed. Generally there are two processes described. One process involves the concentration of a target solute in the first solution; the other process involves the extraction of a solvent from a first solution both by a second solution comprising of water and soluble gas or water, soluble gas, and a compound by creating an osmotic concentration gradient across the semi permeable membrane. The first solution is under pressure from an inert gas and the second solution is under pressure from a soluble gas with equal system pressures greater than 1 atmosphere. The increase or decrease of partial pressure of the soluble gas in the second solution increases or decreases the chemical potential of the (Continued)

second solution to achieve different solution properties. The soluble gas may be carbon dioxide and the compound may be magnesium hydroxide.

17 Claims, 7 Drawing Sheets

(51) Int. Cl.
| | |
|---|---|
| B01D 61/58 | (2006.01) |
| C01F 5/02 | (2006.01) |
| C01F 5/14 | (2006.01) |
| C01F 5/20 | (2006.01) |
| C01F 5/24 | (2006.01) |
| C02F 1/68 | (2006.01) |
| C02F 103/08 | (2006.01) |
| C02F 103/32 | (2006.01) |
| C02F 103/34 | (2006.01) |
| C02F 103/00 | (2006.01) |
| C02F 1/00 | (2006.01) |

(52) U.S. Cl.
CPC . *C02F 1/44* (2013.01); *C02F 1/68* (2013.01); *B01D 2311/25* (2013.01); *C01F 5/02* (2013.01); *C01F 5/14* (2013.01); *C01F 5/20* (2013.01); *C01F 5/24* (2013.01); *C02F 1/442* (2013.01); *C02F 2001/007* (2013.01); *C02F 2103/007* (2013.01); *C02F 2103/08* (2013.01); *C02F 2103/32* (2013.01); *C02F 2103/343* (2013.01); *C02F 2209/03* (2013.01); *C02F 2301/06* (2013.01)

(56) References Cited

U.S. PATENT DOCUMENTS

| | | | | |
|---|---|---|---|---|
| 4,693,872 | A * | 9/1987 | Nakaya | C01F 5/145 423/164 |
| 4,698,379 | A * | 10/1987 | Nakaya | B82Y 30/00 423/635 |
| 6,391,205 | B1 * | 5/2002 | McGinnis | B01D 61/002 210/642 |
| 8,002,989 | B2 | 8/2011 | McGinnis | |
| 8,021,549 | B2 | 9/2011 | Kirts | |
| 2005/0255174 | A1 * | 11/2005 | Shelley | A61K 33/10 424/686 |
| 2010/0276369 | A1 | 11/2010 | Haag | |
| 2011/0155666 | A1 * | 6/2011 | Prakash | B01D 61/04 210/641 |
| 2011/0203994 | A1 * | 8/2011 | McGinnis | B01D 61/002 210/650 |
| 2012/0267306 | A1 * | 10/2012 | McGinnis | B01D 61/002 210/637 |

OTHER PUBLICATIONS

Earth's Atmosphere. Modified on Jul. 24, 2015. Retrieved from http://www.newworldencyclopedia.org/entry/Earth's_atmosphere.*

International Search Report for International Application No. PCT/US2014/070745 mailed Mar. 18, 2015.

Nritten Opinion of the International Searching Authority for International Application No. PCT/US2014/070745 mailed Mar. 18, 2015.

J.E. Miller, "Review of water resources and desalination technologies," Sandia National Laboratories, Mar. 2003.

Achilli, Andrea et al., "Selection of inorganic-based drawn solution for forward osmosis applications," Journal of membrane science, vol. 364, No. 1-2, Aug. 14, 2010, pp. 233-241.

Stumm, Werner, Aquatic Chemistry, An Introduction Emphasizing Chemical Equilibria in Natural Waters, 2nd Ed. (1981), pp. 241-243.

Shoba, V.N. and Sen'kov, A. A., "Equilibrium composition and properties of soil solutions," Eurasian Soil Science, 2011, vol. 44, No. 10, pp. 1068-1076.

* cited by examiner

Traditional FO; Flux = $D(\Delta P - \Delta \pi) = D((0-0) - (\pi_{Feed} - \pi_{Draw}))$ (2.1)

Pressurized FO; Flux = $D(\Delta P - \Delta \pi) = D((P_{Feed} = P_{Draw}) - (\pi_{Feed} - \pi_{Draw}))$ (2.2)

FIGURE 2

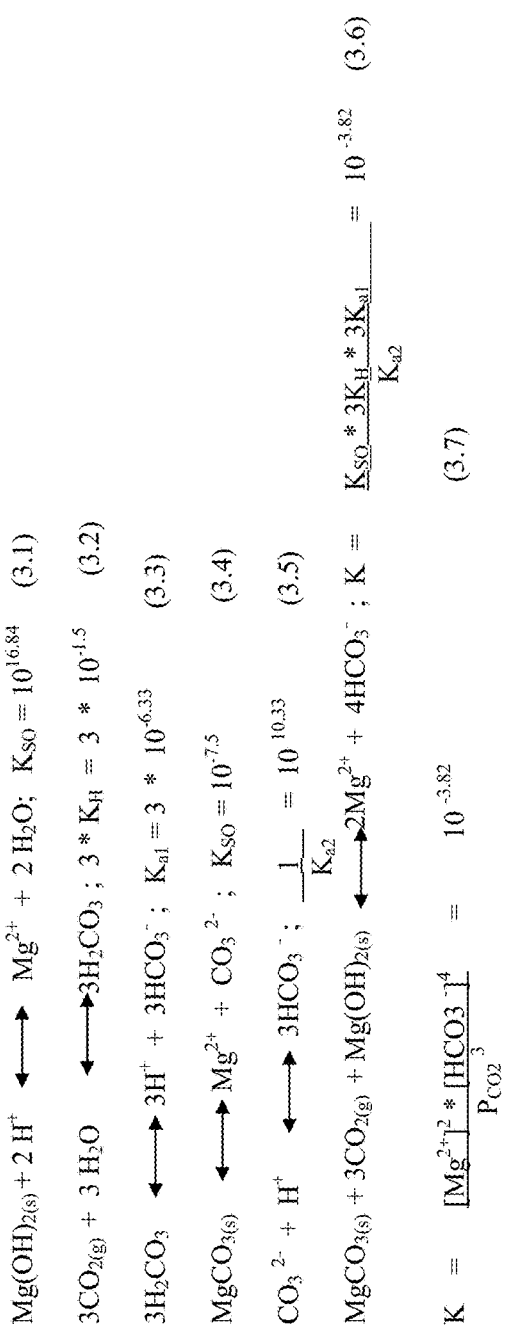

$Mg(OH)_{2(s)} + 2 H^+ \longleftrightarrow Mg^{2+} + 2 H_2O; \quad K_{SO} = 10^{16.84}$ (3.1)

$3CO_{2(g)} + 3 H_2O \longleftrightarrow 3H_2CO_3 ; \quad 3 * K_H = 3 * 10^{-1.5}$ (3.2)

$3H_2CO_3 \longleftrightarrow 3H^+ + 3HCO_3^- ; \quad K_{a1} = 3 * 10^{-6.33}$ (3.3)

$MgCO_{3(s)} \longleftrightarrow Mg^{2+} + CO_3^{2-} ; \quad K_{SO} = 10^{-7.5}$ (3.4)

$CO_3^{2-} + H^+ \longleftrightarrow 3HCO_3^- ; \quad \dfrac{1}{K_{a2}} = 10^{10.33}$ (3.5)

$MgCO_{3(s)} + 3CO_{2(g)} + Mg(OH)_{2(s)} \longleftrightarrow 2Mg^{2+} + 4HCO_3^- ; \quad K = \dfrac{K_{SO} * 3K_H * 3K_{a1}}{K_{a2}} = 10^{-3.82}$ (3.6)

$K = \dfrac{[Mg^{2+}]^2 * [HCO3^-]^4}{P_{CO2}^3} = 10^{-3.82}$ (3.7)

Due to Electroneutrality, the following equation exists $[H^+] + 2[Mg^{2+}] = [OH^-] + [HCO_3^-] + 2[CO_3^{2-}]$ (3.8)

At pH 7, the following equation exists $2[Mg^{2+}] = [HCO3^-]$ (3.9)

$K = \dfrac{16[Mg^{2+}]^6}{P_{CO2}^3} = 10^{-3.82}$ (3.10)

$[Mg^{2+}] = \sqrt[6]{\dfrac{K}{16} * P_{CO2}^3}$ (3.11)

FIGURE 3

| System Temp. | CO2 Partial Pressure 0.0035 Atm | CO2 Partial Pressure 1.0 Atm | CO2 Partial Pressure 3.0 Atm | CO2 Partial Pressure 8.0 Atm | CO2 Partial Pressure 10.0 Atm |
|---|---|---|---|---|---|
| Degree Celsius | OP (Atm) | OP (Atm) | OP (Atm) | OP (Atm) | OP (Atm) |
| 10 deg. | 1.1 | 28.7 | 45.9 | 83.3 | 92.6 |
| 20 deg. | 1.2 | 20.1 | 36.0 | 59.8 | 66.9 |
| 30 deg. | 1.2 | 13.7 | 24.3 | 40.3 | 45.1 |

FIGURE 4

PRESSURIZED FORWARD OSMOSIS PROCESS AND SYSTEM

CROSS REFERENCE TO RELATED APPLICATIONS

The present application claims priority to U.S. Provisional application No. 61,920,512, filed Dec. 24, 2013, the entire contents of which are hereby incorporated by reference as non-limiting example embodiments.

The following patented and non-patented literature are also acknowledged

1. US 2011/0203994 A1
2. J. E. Miller, "Review of water resources and desalination technologies" (Sandia National Laboratories, March 2003
3. Achilli, Andrea, et al. "Selection of inorganic-based draw solutions for forward osmosis applications." Journal of membrane science 364.1-2 (2010):233-241.
4. Stumm, Werner. Aquatic Chemistry. An Introduction Emphasizing Chemical Equilibria in Natural Waters. 2nd Ed. (1981).
5. Shoba, V. N.; Sen'kov, A. A. "Equilibrium composition and properties of soil solutions.", Eurasian Soil Science (2011), 44(10), 1068-1076.

FIELD OF THE INVENTION

The field of invention relates to osmosis process, more specifically, pressurized forward osmosis process for osmotic separation of aqueous solutions by providing osmotic pressure at different variations for seawater desalination, wastewater purification and product recovery in high purity applications.

BACKGROUND

Prior Art

Osmosis is a mass transport phenomenon that is defined as the net movement of water (solvent) across a selectively permeable membrane driven by a difference in osmotic pressure across the membrane. Forward osmosis and reverse osmosis are commercially viable for water purification and for traditional water treatment process. Forward osmosis provides an advantage over reverse osmosis because it operates at low or no hydraulic pressures, has high rejection of a wide range of contaminants, and it has a lower membrane fouling propensity than pressure driven membrane processes. Additional benefits of forward osmosis are that the only hydraulic pressure applied to the membrane is due to flow resistance in the membrane module and the membrane requires limited support. However, a limitation of forward osmosis is the costs associated with the draw solution regeneration process. In the alternative, pressurized forward osmosis creates a process that increases the competitive advantage over traditional osmosis processes. Pressurized forward osmosis operates the forward osmosis process under a system pressure greater than 1 atmosphere on both the sides of the system. Further using a soluble gas on the draw side of the system, the chemical potential is controlled by the applied partial pressure of the soluble gas. The energy required to pressurize the system can be recovered at high efficiency. The costs to regenerate the draw solutes and the marketable by-products net out a more competitive osmosis process versus other osmosis technologies.

US patent 2011/0203994 A1 describes a process whereby a draw solution is created by mixing ammonia gas and carbon dioxide gas which operates at high osmotic pressures, however the costs for the regeneration of the gases are high as the regeneration process requires heating the diluted draw solution to decompose the soluble ions into gases that leave the aqueous system. Additionally, there is a need for an alternative and improved cost effective method of forward osmosis for various industrial applications such as seawater desalination, wastewater purification and product recovery in high purity applications.

SUMMARY

In accordance with one or more embodiments, a pressurized forward osmosis separation process is disclosed. The process may comprise of introducing a first solution on the first side of a semi-permeable membrane and a second solution on the second side of a semi-permeable membrane with both the first side and second side under a system pressure equal to or greater than 1 atm. Further, the first side of the semi-permeable membrane is under pressure from an inert gas or air and the second side of the semi-permeable membrane is under pressure from a soluble gas or carbon dioxide at partial pressure greater than 0.00035 atmospheres, so that the resulting osmotic pressure in the second side is greater than the first side. This thereby forms an osmotic concentration gradient across the semi-permeable membrane which promotes the flow of at least a portion of the solvent of the first solution across the semi-permeable membrane to form a third solution on the first side of the semi-permeable membrane and a fourth solution on the second side of the semi-permeable membrane.

In some embodiments, the first solution may be an aqueous solution. In some embodiments, the first solution comprises a stream from surface water or wastewater or a pharmaceutical or food grade operation aqueous solution with low osmotic pressure. The target species may comprise of metals, salts, sugars, enzymes, proteins or microorganisms. In some embodiments, introducing the first solution on a first side of the semi-permeable membrane comprises immersing the semi-permeable membrane in the first solution. Introducing the second solution may comprise directing the second solution along the second side of the semi-permeable membrane. In at least one embodiment, the first solution is introduced continuously.

In some embodiments, recovering at least one target species comprises introducing the third solution to a settling vessel, hydrocyclone, precipitator, or force gradient operation. In some embodiments, the process may further comprise introducing the at least one recovered target species to a further treatment unit. At least one treated target species may be supplied to a downstream point of use.

In one or more embodiments, the process may further comprise promoting the flow of at least a portion of the fourth solution to a separation operation thereby releasing a soluble gas leaving a solvent stream. The process may further comprise of capturing the soluble gas or carbon dioxide and returning the soluble gas or carbon dioxide to the second side of the semi-permeable membrane. The process may further comprise a step of processing the solvent stream.

In accordance with one or more embodiments, a pressurized forward osmosis separation process is disclosed. The process may comprise introducing a first solution comprising a solvent and at least one target species on a first side of a semi-permeable membrane under a system pressure greater than 1 atmosphere of inert gas or air. The process may further comprise of introducing a second solution comprising of a magnesium species and carbon dioxide greater than 0.00035 atmosphere partial pressure with a system pressure equal to the first side, so that the resulting osmotic pressure in the second side is greater than the first side. This thereby forms an osmotic concentration gradient across the semi-permeable membrane which promotes the flow of at least a portion of the solvent of the first solution across the semi-permeable membrane to form a third solution on the first side of the semi-permeable membrane and a fourth solution on the second side of the semi-permeable membrane.

In some embodiments, the first solution may be an aqueous solution. In some embodiments, the first solution comprises a stream from sea water or wastewater or a pharmaceutical or food grade operation aqueous solution. The target species may comprise of metals, salts, sugars, enzymes, proteins or microorganisms. In some embodiments, introducing the first solution on a first side of the semi-permeable membrane comprises immersing the semi-permeable membrane in the first solution. Introducing the second solution may comprise directing the second solution along the second side of the semi-permeable membrane. In at least one embodiment, the first solution is introduced continuously.

In some embodiments, recovering at least one target species comprises introducing the third solution to a settling vessel, hydrocyclone, precipitator, or force gradient operation. In some embodiments, the process may further comprise introducing the at least one recovered target species to a further treatment unit. At least one treated target species may be supplied to a downstream point of use.

In one or more embodiments, the process may further comprise promoting the flow of at least a portion of the fourth solution to a separation operation thereby releasing a soluble gas and generating precipitates and a solvent stream. The process may further comprise of capturing the soluble gas and returning the soluble gas to the second side of the semi-permeable membrane. The process may further comprise processing the precipitates and returning the processed precipitates to the second side of the semi-permeable membrane. The process may further comprise a step of processing the solvent stream.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures:

FIG. 2 describes forward osmosis and pressurized forward osmosis processes.

FIG. 3 describes the key reactions to develop a theoretical estimate of osmotic pressure per unit mass of MgX and partial pressure of $CO_2$ FIG. 4 describes the table of magnesium oxide and carbon dioxide system osmotic pressure FIG. 5 provides a graphical representation of osmotic pressure and pH vs. time for $CO_2$ partial pressure of 1 atm.; MgO in excess. pH on Secondary axis.

DETAILED DESCRIPTION

Figure 1:
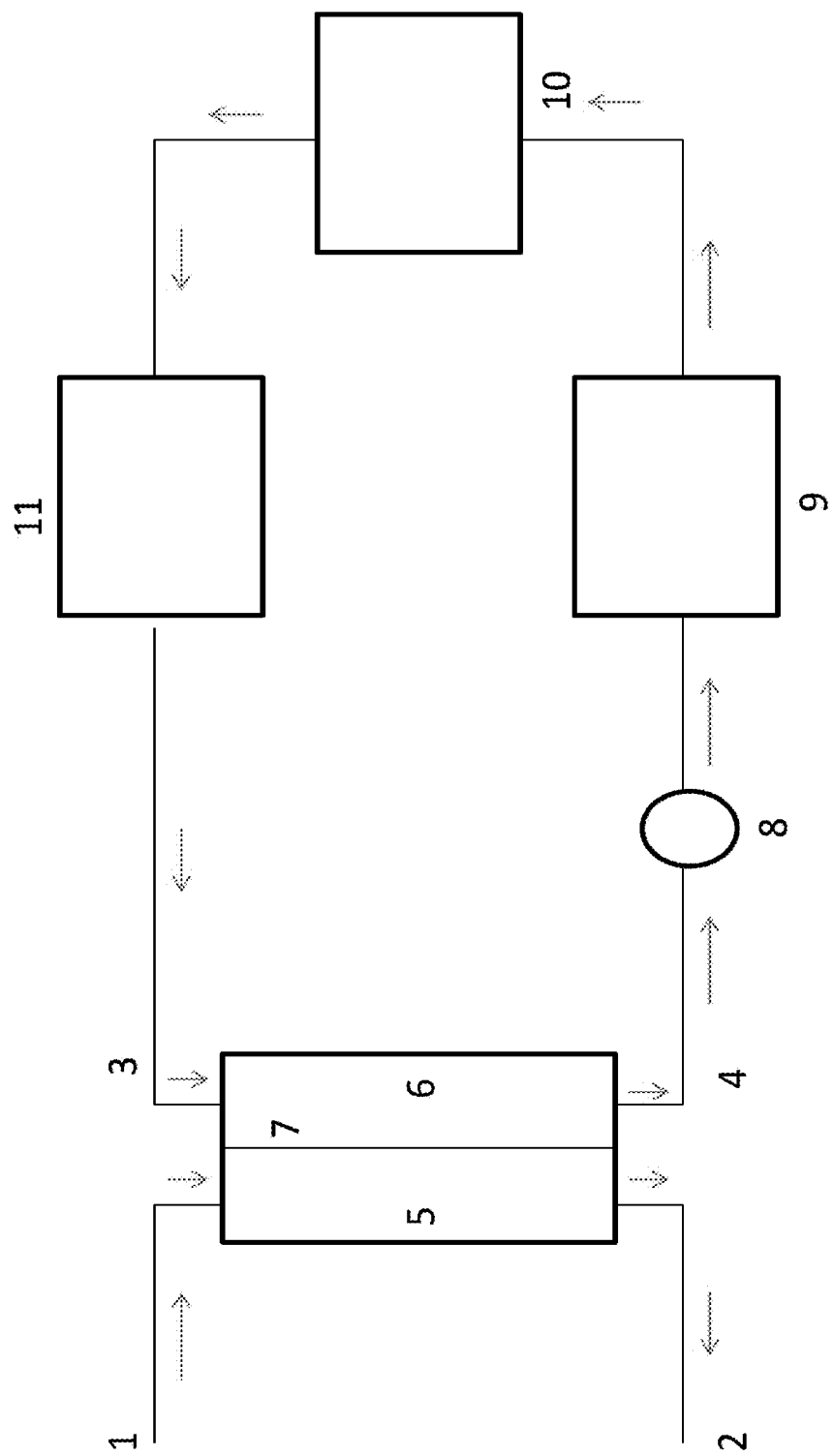
FIG. 1 presents a schematic diagram of a pressurized forward osmosis process.

In the disclosure herein, consideration or use of a particular element number in a given FIG. or corresponding descriptive material can encompass the same, an equivalent, or an analogous element number identified in another FIG. or descriptive material corresponding thereto.

In accordance with one or more embodiments, a pressurized forward osmosis separation process is disclosed herein, which may be used to extract various types of solutes from various types of solvents in solution. The desired products resulting from the disclosed process may include the solvent, the solute or both. In at least one embodiment, products such as metals, salts, sugars, enzymes, proteins, microorganisms, pharmaceuticals or other compounds may be recovered from a process stream. In other embodiments, waste streams such as seawater or wastewater may be treated to recover purified water for downstream use.

In accordance with one or more embodiments, the process may comprise of introducing a first solution with at least one target species on a first side of the semi permeable membrane under a specified system pressure greater than 1 atmosphere of inert gas or air. The process may further comprise of introducing a second solution with an increased concentration of solute relative to that of the first solution, comprising of a soluble gas or carbon dioxide at partial pressure greater than 0.00035 atmosphere or magnesium species and carbon dioxide at a partial pressure greater than 0.00035 atmosphere on the second side of the semi permeable membrane under an equal system pressure of first side forming an osmotic gradient across the semi permeable membrane, which promotes the flow of at least one portion of the first solution, forming a third solution on the first side of the semi permeable membrane and a fourth solution on the second side of the semi permeable membrane.

In another embodiment, the process may further comprise of promoting the flow of at least a portion of fourth solution to a separation operation to isolate and regenerate draw solutes and returning the draw solutes to the second side of the semi permeable membrane. The process may further comprise of recovering at least one or more target species from the third solution.

In some embodiments, the first solution is an aqueous solution and may comprise a stream of natural body of water, sea water, waste water, brackish water, food or pharmaceutical grade solution. The target species may comprise of metal, salt, sugar, protein, pharmaceutical compound, enzyme or microorganism.

In accordance with one or more embodiments, a pressurized forward osmosis separation system may include one or more forward osmosis membranes. The forward osmosis membranes may generally be semi-permeable, for example, allowing the passage of solvent such as water, but excluding dissolved solutes therein, such as sodium, chloride, magnesium, magnesium bicarbonate, bicarbonate, carbonate, other metals, salts, sugars, protein, pharmaceutical compound, enzyme, microorganism or other compounds. Many types of semi-permeable membranes are suitable for this purpose provided that they are capable of allowing the passage of water (i.e., the solvent) while blocking the passage of the solutes and not reacting with the solutes in the solution. The membrane can have a variety of configurations including thin films, hollow fiber membranes, spiral wound membranes, monofilaments and disk tubes. There are numerous well known, commercially available semi-permeable membranes that are characterized by having pores small enough to allow water to pass while screening out solute molecules such as sodium chloride and their ionic molecular species such as chloride. Such semi-permeable membranes can be made of organic or inorganic materials. In some embodiments, membranes made of materials such as cellulose acetate, cellulose nitrate, polysulfone, polyvinylidene fluoride, polyamide and acrylonitrile co-polymers may be used. Other membranes may be mineral membranes or ceramic membranes made of materials such as $ZrO_2$ and $TiO_2$.

In accordance with one or more embodiments, a pressurized forward osmosis separation system may generally be constructed and arranged so as to bring a first solution and a second solution into contact with first and second sides of a semi-permeable membrane, respectively. Although the first and second solutions can remain stagnant, it is preferred that both the first and second solutions are introduced by cross flow, i.e., flows parallel to the surface of the semi-permeable membrane. This may generally increase membrane surface area contact along one or more fluid flow paths, thereby increasing the efficiency of the forward osmosis. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

In accordance with one or more embodiments, methods may achieve a high yield of solvent extraction without excessive energy demands and/or environmentally harmful waste discharge. Solvent may be extracted to concentrate solutes, such as desirable target species, from a process stream in an energy efficient manner that results in high yields. The solvent and/or recovered solutes from the process stream may be desired end products. Solutes in the draw solution may also be recycled within the process.

In one or more embodiments, the disclosed pressurized forward osmosis process uses the added soluble gas under pressure to modify the chemical potential of the second solution and the gas pressure is not used to drive the osmotic process. Forward osmosis remains the driving force of the process as the second solution osmotic pressure is created by reacting water and magnesium species and carbon dioxide at partial pressures greater than 0.00035 atmosphere, while the system pressure of the first solution and the second solution are equal. In some embodiments, the traditional forward osmosis system has a sum of the hydraulic pressure terms (P terms) equal to zero and the process is driven by osmotic pressure. In pressurized forward osmosis, the P terms are equal and greater than 1 atmosphere and the process is driven by the resulting osmotic pressure. FIG. 1 provides a general schematic of the process. Equations 2.1 and 2.2 in FIG. 2 describe the traditional and pressurized forward osmosis process.

In another embodiment, the focus of the disclosed process is related to the creation of draw solution that is used in the pressurized forward osmosis process. Preferred solutes for the second solution may be magnesium oxide or magnesium hydroxide or magnesium carbonate (basic), or other magnesium species and carbon dioxide and their products; magnesium, magnesium bicarbonate, bicarbonate, carbonate when dissolved in water at various molar ratios and placed under a carbon dioxide partial pressure greater than 0.00035 atmosphere. A theoretical estimate magnesium ion concentration based on the partial pressure of $CO_2$ is developed by key reactions as illustrated in FIG. 3, equations 3.1-3.11.

In accordance to one or more embodiments, a theoretical estimate of osmotic pressure per unit mass of magnesium hydroxide and partial pressure of $CO_2$ is determined from equation 3.11. FIG. 4. provides the estimated osmotic pressure of the $CO_2/Mg(OH)_2$ system based on a computer model.

In another embodiment, the degeneration of the draw solution is performed by removing the $CO_2$ from the system; both the increased partial pressure and residual dissolved $CO_2$. By removing $CO_2$ from the system, the system immediately starts to form $MgCO_3$, which is an insoluble compound. The rate of precipitation is increased by purging air or inert gas through the system. In some embodiments the ion concentration can be further reduced by adding MgO or $Mg(OH)_2$ to increase the pH to drive the formation and precipitation of $MgCO_3$. In some embodiments, the addition of MgO or $Mg(OH)_2$ is also considered the first step of the process to restart the cycle.

In accordance with some embodiments, flat leaf experiment, open atmosphere experiment and pressure vessel experiment were performed to provide a technical basis for the disclosed process. The flat leaf experiment demonstrated that a transmembrane flux can be operated at elevated pressures without rupturing the membrane or increasing the salt diffusion into the feed solution. According to the process disclosed herein, the test set up for the flat leaf experiment included a test setup consisting of two pressure vessels, ball valves, gas tubing (rated for 250 psi), circulating pumps (rated for 145 psi), the flat leaf chamber and forward osmosis membranes. The draw solution pressure vessel was prepared with 200 ml of deionized water with 20 grams of $MgCO_3$ (basic); 70 percent $MgCO_3$ and 30 percent $Mg(OH)_2$. The draw solution vessel was charged to 135 psi partial pressure (approximate 8 atmosphere) of 99 percent $CO_2$ gas and allowed to achieve system equilibrium. The feed solution vessel was filled with deionized water and pressurized with air to 135 psi. The vessels were connected to the flat leaf system and pumps were turned on for 60 minutes. After 60 minutes, the solution from the draw solution vessel was collected and measured in a graduated cylinder that correlated to an osmotic pressure of 34.8 atmospheres.

Figure 5:
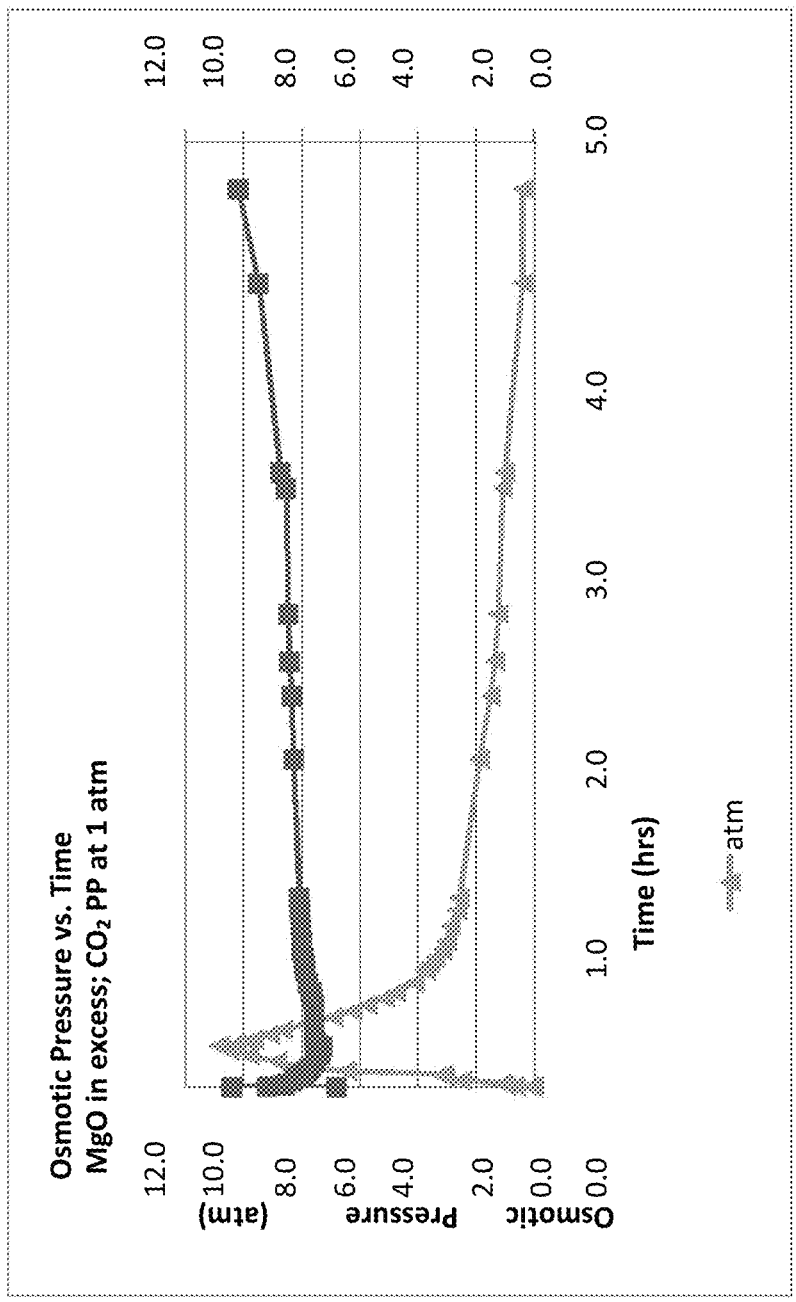

In accordance with some embodiments, the open atmosphere experiment was conducted in an Erlenmeyer flask with 50 ml of deionized water and magnesium oxide in excess as carbon dioxide gas was bubbled through the solution. After a determined time period, the $CO_2$ was stopped and air was bubbled through the solution. After another determined time period, CaO and MgO were added to the solution. Conductivity and pH measurements were recorded as a function of time. The open atmosphere experiment with $CO_2$ and MgO demonstrated the ability for the system to cycle from high osmotic pressures to low osmotic pressures based on the partial pressure of carbon dioxide as illustrated in FIG. 5.

Figure 6:
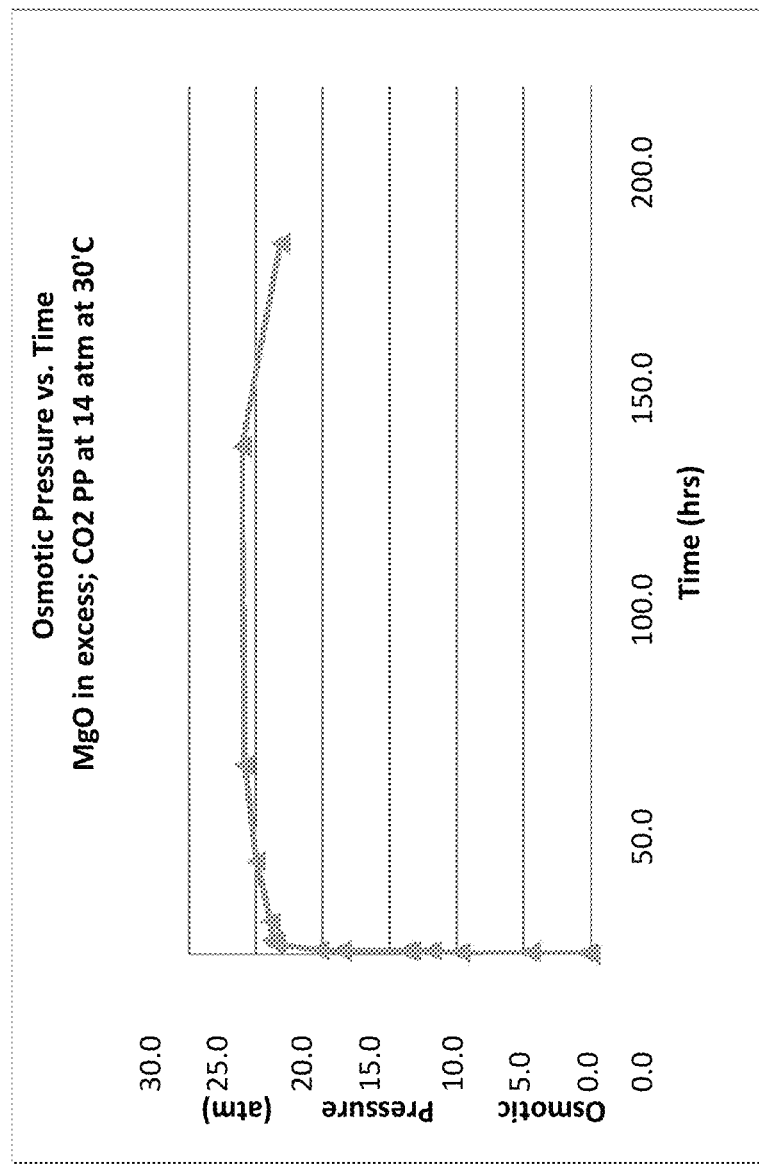
FIG. 6 provides a graphical representation of osmotic pressure vs. time for $CO_2$ partial pressure of 14 atmosphere; MgO in excess FIG. 7 provides a detailed schematic diagram of pressurized forward osmosis process and a detailed schematic diagram of draw solute regeneration.

According to some embodiments disclosed herein, the pressure vessel experiment was conducted using the pressure vessel, ball valves, gas tubing (rated at 250 psi) and a conductivity meter. Magnesium oxide in excess and 20 ml of deionized water was placed in the clear gas tubing with one end connected to the pressure vessel and the other end connected to the conductivity meter. The pressure vessel was placed under pressure of 14 atmosphere of 99 percent $CO_2$ gas. The systems were connected by opening the ball valve and conductivity readings were measured as a function of time. The pressure vessel experiment demonstrated that high osmotic pressures were attainable as a function of increased partial pressure of $CO_2$. The partial pressure of $CO_2$ at 14 atmosphere was maintained for 1 week with the corresponding system osmotic pressure achieving and sustaining a conductivity of 60 mS or osmotic pressure of 26 atmosphere as illustrated in FIG. 6.

In accordance with one or more embodiments, flat leaf, open atmosphere and pressure vessel experiments make the case to use the pressurized forward osmosis process for a variety of feed solutions in pressurized forward osmosis applications.

In accordance with one or more embodiments as shown in FIG. 1, a solution (1), for example, seawater, brackish water, wastewater, contaminated water or other solution, referred to as the first solution, is disposed in a first chamber (5). The first chamber is in fluid communication with a semi-permeable membrane. A second solution, the $MgX/CO_2$ draw solution (3), having a concentration greater than the first solution (1) is contained in second chamber (6). The higher concentration solution enables the solvent, i.e., the water, from the first solution in the first chamber (5) to osmosis across the semi-permeable membrane (7) into the more concentrated second solution located within the second chamber (6). Having lost much of its solvent, the remaining first solution (1) in the first chamber (5) is concentrated in solute (2). The solute (2) may be discarded if considered a waste product. Alternatively, the solute (2) may be a target compound and may be collected for further processing or downstream use as a desired product. The resulting solvent-enriched second solution (3) in the second chamber (6) is then introduced, as illustrated by arrow, into a third chamber (9). In the third chamber (9) magnesium carbonate is removed and magnesium oxide is added and directed into fourth chamber (10) where $CO_2$ at partial pressure greater than 1 atmosphere is added and directed into a fifth chamber (11). The solute enriched second solution from the fifth chamber (11) is cycled back to second chamber (6), as using a pump (8), to maintain the concentration of the second solution. The remaining solvent-enriched second solution in the third chamber (9), is mixed with inert gas to remove carbon dioxide from the solvent stream. In some embodiments, such as those involving treatment of seawater or wastewater, the solvent stream may be purified water.

In accordance with one or more embodiments, a separation process may begin by bringing the first solution and the second solution into contact with the first and second sides of the semi-permeable membrane (7), respectively. Although the first and second solutions can remain stagnant, it is preferred that both the first and second solutions are introduced by cross flow, i.e., flows parallel to the surface of the semi-permeable membrane (7). This increases the amount of surface area of the semi-permeable membrane a given amount of the solutions comes into contact with thereby increasing the efficiency of the forward osmosis. Since the second solution in the second chamber has a higher solute concentration than the first solution in the first chamber, the solvent in the first solution diffuses to the second solution by forward osmosis. During the separation process, the first solution becomes more concentrated as it loses solvent and the second solution becomes more diluted as it gains solvent. Despite this occurrence, the concentration gradient between the two solutions remains significant. The depleted solution on the first side of the membrane, and the diluted solution on the second side of the membrane may each be further processed for the recovery of one or more desired products. For example, the depleted solution on the first side of the membrane may contain solutes which are target species whose concentration and recovery is desired. Alternatively, the depleted solution on the first side of the membrane may be discarded as waste. Likewise, the diluted solution on the second side of the membrane may be processed to recover desired solvent.

The process described herein may be conducted continuously, or in batches, to better isolate the solutes from solvent throughout the process.

In accordance with one or more embodiments, wherein the said draw solutes are regenerated after use via at least one process of thermal, membrane, precipitation, aerosol, or gas process.

Figure 7:
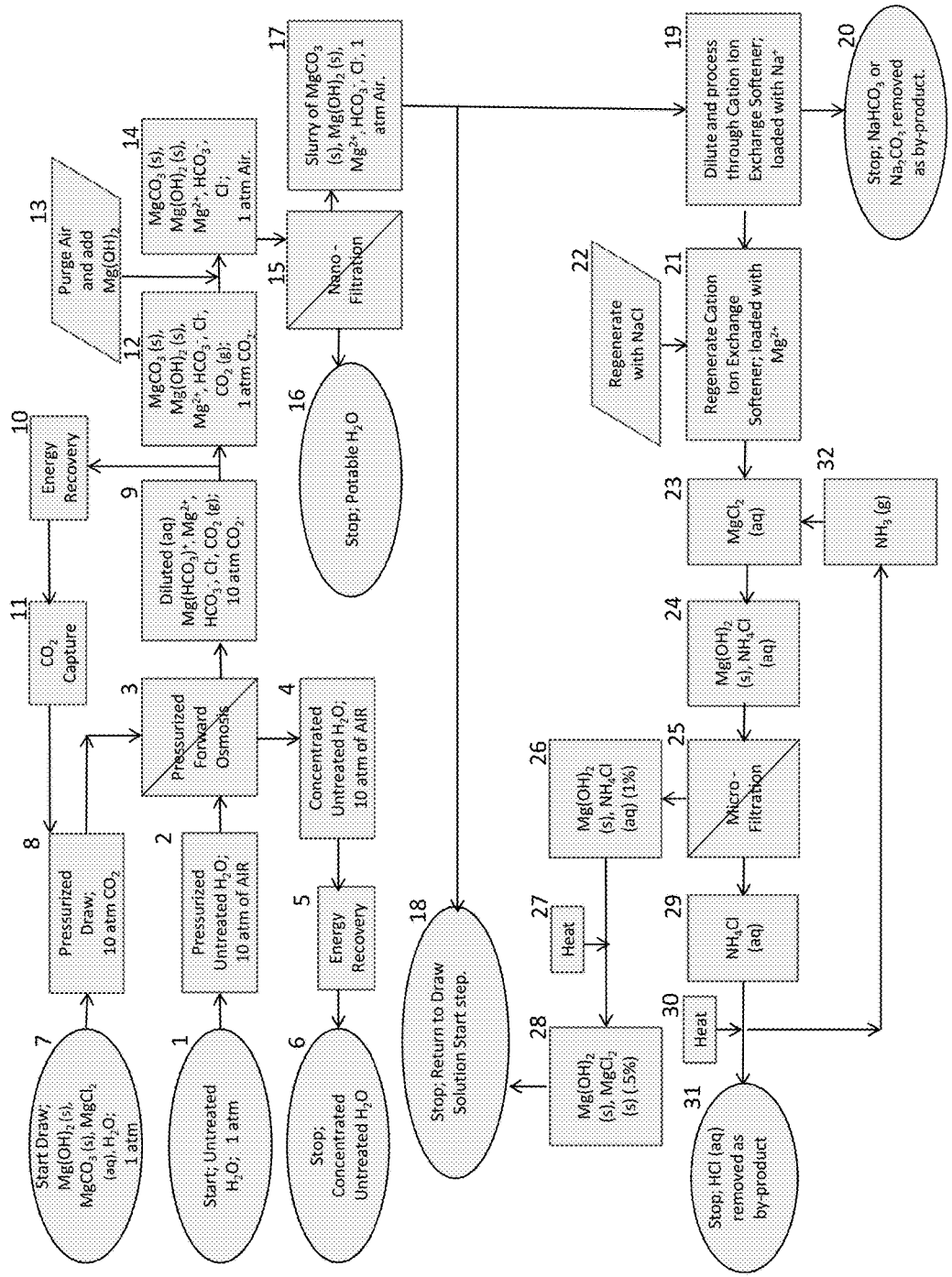

In accordance with one or more embodiments as shown in FIG. 7, a detailed process is described that includes pressurized forward osmosis (steps 1-18) and a draw solute regeneration process (steps 19-32). FIG. 7 depicts one scenario that implements the pressurized forward osmosis process for operation in a continuous basis In accordance with one or more embodiments, a system may be implemented to perform the regeneration of solutes process. One such process comprises of a first chamber, wherein a portion of the fourth solution is fed into the said chamber whereby the fourth solution is heated so that calcination of the solutes forms magnesium oxide and carbon dioxide. A second chamber is used to capture the carbon dioxide for reuse in the forward osmosis process.

In accordance with one or more embodiments, a system may be implemented to perform the regeneration of solutes process. One such process comprises of an ion exchange column, wherein the fourth solution is fed into an ion exchange column to remove the magnesium ions and release sodium ions, whereby forming a solution of sodium carbonate or sodium bicarbonate. A fifth solution of sodium chloride is fed into the ion exchange column to regenerate the column thereby releasing the magnesium ions and removing the sodium ions to form a solution of magnesium chloride, which is placed in the first chamber. A second chamber, wherein the magnesium chloride is mixed with ammonia gas thereby forming magnesium hydroxide (solid) and ammonium chloride. A third chamber, wherein the magnesium hydroxide is captured for reuse in the forward osmosis process. A fourth chamber, wherein the ammonium chloride is heated to form ammonia gas that is removed and captured in a fifth chamber and hydrochloric acid that remains in the fourth chamber for reuse in the regeneration of solutes process.

Any materials may be used to construct the various holding and/or storage devices (chamber, vessels and receptacles), conduits, piping, and related equipment, as long as they will withstand the weight of the solutions, and be unreactive with any solutes within the solutions. Typical materials are non-corrosive, non-reactive materials such as stainless steel, plastic, polyvinyl chloride (PVC), fiberglass, and so forth. The vessels can take any suitable configuration, but are typically cylindrical tanks, contoured or fitted tanks, and so forth. The receptacles are typically water towers, cylindrical tanks, contoured or fitted tanks, and so forth. It is important to note that the chambers are shown as separate units but the invention is not limited to that configuration, and where appropriate, any number of chambers can be contained within a single vessel, for example, partitioned into two chambers separated by the semi-permeable membrane (7).

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, sub systems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

CONCLUSION, RAMIFICATIONS, AND SCOPE

While the above description contains many specificities, these should not be construed as limitations on the scope, but rather as an exemplification of one [or several] embodiments thereof. Many other variations are possible. Accordingly, the scope should be determined not by the embodiments illustrated, but by the appended claims and their legal equivalents.

We claim:

1. A pressurized forward osmosis separation method, the method comprising:
    providing a semi-permeable membrane comprising a first surface and a second surface, wherein the first semi-permeable membrane surface is opposite to the second semi-permeable membrane surface;
    contacting a first solution with the first semi-permeable membrane surface, wherein the first solution comprises a first solvent and a target solute; and
    contacting a second solution with the second semi-permeable membrane surface, wherein the second solution comprises a second solvent and a magnesium ion species, wherein the magnesium ion species is at least one selected from the group consisting of magnesium oxide, magnesium hydroxide and magnesium carbonate;
    wherein the first and the second semi-permeable membrane surfaces are under the same system pressure, which is equal to or greater than 1 atmosphere,
    wherein the first semi-permeable membrane surface is under pressure from an inert gas or air, and
    wherein the second semi-permeable membrane surface is under pressure from a gas mixture comprising carbon dioxide at a partial pressure greater than 0.00035 atmosphere, under conditions wherein $Mg(HCO_3)^{+1}$ is formed in the second solution;
    whereby an osmotic concentration gradient is formed across the semi-permeable membrane, thus promoting flow of at least a portion of the first solvent from the first solution across the semi-permeable membrane to the second solution,
    thereby generating a third solution in contact with the first semi-permeable membrane surface and a fourth solution in contact with the second semi-permeable membrane surface.

2. The method of claim 1, wherein at least a portion of the fourth solution is processed to release gaseous carbon dioxide and generate a precipitate comprising magnesium carbonate.

3. The method of claim 1, wherein the target solute is recovered from the third solution.

4. The method of claim 1, wherein the first solution is an aqueous solution.

5. The method of claim 4, wherein the first solution is at least one selected from the group consisting of surface water, wastewater, contaminated water, pharmaceutical solution and food grade solution.

6. The method of claim 1, wherein the first solution contacts the first semi-permeable membrane surface and the second solution contacts the second semi-permeable membrane surface in a cross flow-filtration system.

7. The method of claim 1, wherein the target solute is at least one selected from the group consisting of salt, sugar, enzyme, protein and microorganism.

8. The method of claim 1, wherein the first semi-permeable membrane surface is fully immersed in the first solution, and wherein the second semi-permeable membrane surface is fully immersed in the second solution.

9. The method of claim 1, wherein the semi-permeable membrane comprises organic materials or inorganic materials.

10. The method of claim 2, wherein the fourth solution is further reacted with at least one selected from the group consisting of magnesium oxide and magnesium hydroxide.

11. The method of claim 1, wherein the second solution is an aqueous solution.

12. The method of claim 9, wherein the semi-permeable membrane comprises at least one selected from the group consisting of cellulose acetate, cellulose nitrate, polysulfone, polyvinylidene fluoride, polyamide and acrylonitrile co-polymers.

13. The method of claim 9, wherein the semi-permeable membrane comprises at least one selected from the group consisting of mineral membrane and ceramic membrane.

14. The method of claim 1, further wherein at least a portion of the fourth solution is subjected to heating to generate a fifth solution and gaseous carbon dioxide.

15. The method of claim 1, further wherein at least a portion of the fourth solution is subjected to an ion exchange process to generate a sixth solution comprising magnesium chloride.

16. The method of claim 15, further wherein the sixth solution is treated with ammonia, forming magnesium hydroxide precipitate and a seventh solution comprising ammonium chloride.

17. The method of claim 16, further wherein the seventh solution is heated to generate gaseous hydrogen chloride and gaseous ammonia.

* * * * *